US010173502B2

(12) United States Patent
Seong et al.

(10) Patent No.: US 10,173,502 B2
(45) Date of Patent: Jan. 8, 2019

(54) DOOR STRUCTURE FOR VEHICLE

(71) Applicant: Hyundai Motor Company, Seoul (KR)

(72) Inventors: JeeHoon Seong, Gwangmyeong-si (KR); Jeong Hyeon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 15/598,982

(22) Filed: May 18, 2017

(65) Prior Publication Data

US 2018/0162206 A1    Jun. 14, 2018

(30) Foreign Application Priority Data

Dec. 13, 2016   (KR) .................. 10-2016-0169728

(51) Int. Cl.
*B62D 25/04* (2006.01)
*B60J 5/04* (2006.01)

(52) U.S. Cl.
CPC ........... *B60J 5/0484* (2013.01); *B60J 5/0425* (2013.01); *B60J 5/0443* (2013.01); *B60J 5/0456* (2013.01); *B60J 5/0463* (2013.01); *B60J 5/04* (2013.01); *B60J 5/042* (2013.01); *B60J 5/048* (2013.01); *B60J 5/0423* (2013.01)

(58) Field of Classification Search
CPC ..... A47L 15/4257; E06B 1/52; E06B 3/7001; E06B 3/72; F25D 23/02; H01L 2924/00014; H01L 2224/45015; H01L 2224/45124; H01L 2224/48091; H01J 9/261
USPC ............................................ 296/146.5, 146.6
See application file for complete search history.

(56) References Cited

U.S. PATENT DOCUMENTS

| 5,544,930 | A  | * | 8/1996  | Stedman ................ | B60J 5/0437 296/146.6 |
| 6,205,714 | B1 | * | 3/2001  | Staser .................... | B60J 5/0416 296/146.6 |
| 6,302,473 | B1 | * | 10/2001 | Weber .................... | B60J 5/0443 296/146.6 |
| 6,931,791 | B1 | * | 8/2005  | Pleiss .................... | B60J 5/0416 49/352 |
| 7,231,717 | B2 | * | 6/2007  | Wurm .................... | B60J 5/0405 29/458 |
| 8,444,208 | B2 | * | 5/2013  | Inoue .................... | B60J 5/0429 296/146.6 |
| 8,851,553 | B2 | * | 10/2014 | Rakei .................... | B60J 5/0444 296/146.6 |
| 8,882,180 | B2 | * | 11/2014 | van Oirschot ......... | B60J 5/0458 180/289 |
| 9,150,084 | B2 | * | 10/2015 | Makowski ............. | B60J 5/0456 |
| 9,592,721 | B1 | * | 3/2017  | Kelly ..................... | B60J 5/0422 |
| 9,809,092 | B2 | * | 11/2017 | Kato ...................... | B60J 5/0443 |
| 9,809,093 | B2 | * | 11/2017 | Hu ......................... | B22D 17/00 |

(Continued)

FOREIGN PATENT DOCUMENTS

KR    20-1998-055168 U    10/1998

*Primary Examiner* — Kiran B Patel
(74) *Attorney, Agent, or Firm* — Morgan, Lewis & Bockius LLP

(57) ABSTRACT

A door structure for a vehicle may include an external panel; an internal panel that is mounted to the external panel; and an impact member coupled to the internal panel between the external panel and the internal panel, wherein a protrusion that protrudes to an outside thereof toward a side external panel of a vehicle body from inside the internal panel is integrally provided in the impact member.

9 Claims, 3 Drawing Sheets

(56) References Cited

U.S. PATENT DOCUMENTS

| | | | | |
|---|---|---|---|---|
| 9,815,353 B2* | 11/2017 | Jang | ................ | B60J 5/0463 |
| 9,873,312 B2* | 1/2018 | Eckart | ................ | B60J 5/0426 |
| 2001/0017476 A1* | 8/2001 | Nishikawa | ................ | B60J 5/0416 |
| | | | | 296/146.6 |
| 2002/0069609 A1* | 6/2002 | Nees | ................ | B60J 5/0444 |
| | | | | 296/202 |
| 2002/0073627 A1* | 6/2002 | Hock | ................ | B60J 5/0406 |
| | | | | 49/502 |
| 2003/0107235 A1* | 6/2003 | Komatsu | ................ | B60J 5/0405 |
| | | | | 296/146.5 |
| 2004/0104593 A1* | 6/2004 | Nakagawa | ................ | B60J 5/0443 |
| | | | | 296/146.6 |
| 2004/0124663 A1* | 7/2004 | Chu | ................ | B60J 5/0437 |
| | | | | 296/146.6 |
| 2007/0210612 A1* | 9/2007 | Kidachi | ................ | B60J 5/0418 |
| | | | | 296/146.6 |
| 2008/0238136 A1* | 10/2008 | Fuetterer | ................ | B60J 5/0416 |
| | | | | 296/146.6 |
| 2009/0026795 A1* | 1/2009 | Tate | ................ | B60J 5/0429 |
| | | | | 296/146.6 |
| 2011/0221229 A1* | 9/2011 | Rouhana | ................ | B60J 5/042 |
| | | | | 296/146.6 |
| 2014/0001788 A1* | 1/2014 | Ito | ................ | B60J 5/0429 |
| | | | | 296/146.6 |
| 2014/0125087 A1* | 5/2014 | Kalliomaki | ................ | B60J 5/0416 |
| | | | | 296/146.6 |
| 2014/0191535 A1* | 7/2014 | Sugiyama | ................ | B62D 25/16 |
| | | | | 296/193.05 |
| 2014/0246879 A1* | 9/2014 | Ishigame | ................ | B60J 5/0443 |
| | | | | 296/146.6 |
| 2014/0361576 A1* | 12/2014 | Storgato | ................ | B60J 5/0416 |
| | | | | 296/146.6 |
| 2015/0352929 A1* | 12/2015 | Brar | ................ | B60J 5/0431 |
| | | | | 296/187.12 |
| 2016/0107512 A1* | 4/2016 | List Clausen | ................ | B60J 5/0402 |
| | | | | 49/503 |

* cited by examiner

DOOR STRUCTURE FOR VEHICLE

CROSS-REFERENCE(S) TO RELATED APPLICATIONS

The present application claims priority to Korean Patent Application No. 10-2016-0169728, filed on Dec. 13, 2016, the entire contents of which are incorporated herein for all purposes by this reference.

BACKGROUND OF THE INVENTION

Field of the Invention

The present invention relates to a door structure for a vehicle. More particularly, the present invention relates to a door structure for a vehicle, in which an external panel made of a metallic material and an internal panel made of carbon fiber reinforced plastics (CFRP) are coupled, and the internal panel can be prevented from being damaged when a side crush of the vehicle occurs.

Description of Related Art

In general, a vehicle door is rotatably disposed on a vehicle body through a hinge configured to open and close a cabin formed by the vehicle body.

In addition, an impact beam is disposed in the door of the vehicle to protect a passenger by preventing the door from being excessively pushed into the cabin when the side crush of the vehicle occurs.

Recently, lightweight vehicles have been issued for the enhancement of fuel consumption of a vehicle, and accordingly, attempts to make a door for a vehicle using other material, for example, carbon fiber reinforced plastics (CFRP) instead of using stainless steel have been continuously carried out.

In general, the door of the vehicle is formed by coupling an external panel that is disposed externally along a width direction of the vehicle and an internal panel that is disposed internally.

In the door manufactured in such a way, the external panel and the internal panel both may be made of a CFRP material. However, the external panel is made of stainless steel or aluminum and the internal panel is made of the CFRP material for maintaining proper stiffness of the door. That is, a door of a vehicle, manufactured by coupling an external panel and an internal panel that are made of different types of materials, respectively has been researched and developed.

In consideration of such a door made of different materials, a method for optimizing a coupling structure of the external panel and the internal panel and a disposition structure of an impact beam has been needed.

The information disclosed in this Background of the Invention section is only for enhancement of understanding of the background of the invention and should not be taken as an acknowledgement or any form of suggestion that this information forms the prior art already to a person skilled in the art.

BRIEF SUMMARY

Various aspects of the present invention are directed to providing a door for a vehicle, which is manufactured by coupling an external panel including a metallic material and an internal panel including a CRFP material, and can prevent the internal panel from being damaged by transferring impact incident generated from the external panel when a side crush of the vehicle occurs to a side external panel of the vehicle body through an impact member.

A door structure for a vehicle according to an exemplary embodiment of the present invention includes an external panel; an internal panel mounted to the external panel; and an impact member coupled to the internal panel interposed between the external panel and the internal panel, wherein a protrusion that protrudes to the outside toward a side external panel of a vehicle body from inside the internal panel is integrally disposed in the impact member.

A through-rough-hole through which the protrusion penetrates the internal panel may be provided in the internal panel.

A bumper member may be mounted to the protrusion.

The bumper member may include a thermoplastic elastomer (TPE) material.

The bumper member may be bonded to the protrusion.

The bumper member may contact an external side of the internal panel while surrounding an external circumference of the protrusion.

The internal panel may include carbon fiber reinforced plastics (CFRP) material.

The external panel may include a metallic material.

At least one assembly nut that is fastened to the internal panel by an assembly bolt may be coupled to the impact member.

As described, in the door structure of a vehicle according to an exemplary embodiment of the present invention, in which the external panel including the metallic material and the internal panel including the CFRP material are coupled, when a side crush of the vehicle occurs, impact incident transferred from the external panel is transferred to the side external panel of the vehicle body through the protrusion of the impact member, protruded from the internal panel so that the internal panel can be prevented from being directly damaged.

In addition, the bumper member is mounted to the protrusion of the impact member, protruded from the internal panel configured to provide an over-slam bumper wherein the impact and vibration that are generated between the door and the side external panel can be effectively absorbed.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
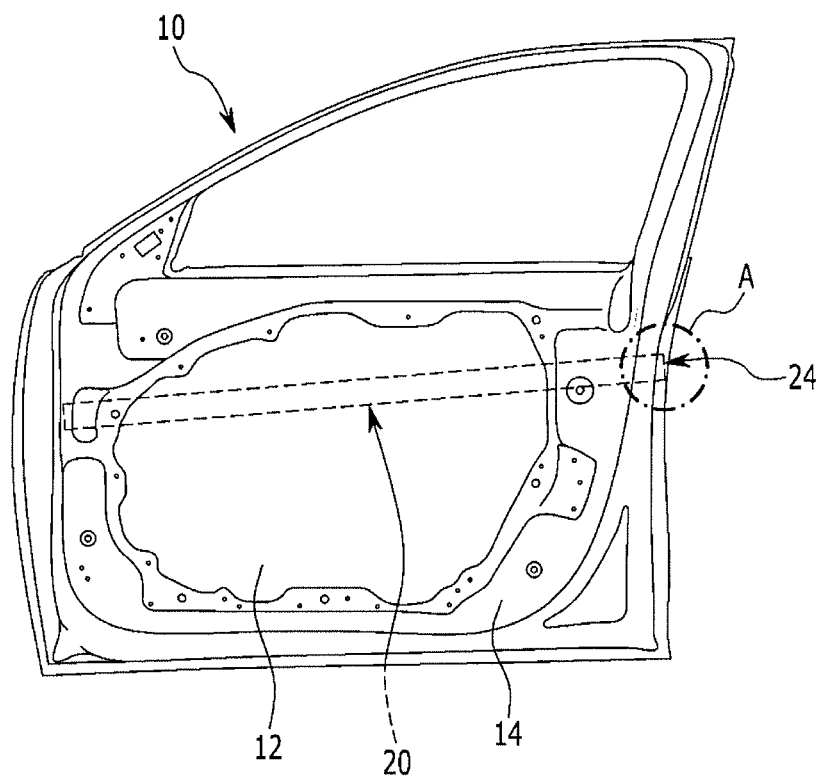
FIG. 1 is an internal front view of a door where a door structure for a vehicle according to an exemplary embodiment of the present invention is applied.

It should be understood that the appended drawings are not necessarily to scale, presenting a somewhat simplified representation of various features illustrative of the basic principles of the invention. The specific design features of the present invention as disclosed here, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplar embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Parts not associated with description are omitted for clearly describing the exemplary embodiments of the present invention, and like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In addition, the terms "unit", "means", "part", "member", or the like, which are described in the specification, mean units of a comprehensive configuration that perform at least one function or operation.

FIG. 1 is an internal front view of a door where a door structure for a vehicle according to an exemplary embodiment of the present invention is applied. As an enlarged view of the portion A of FIG. 1, FIG. 2 shows a coupling relationship between the door and a side external panel, and FIG. 3 is a cross-sectional view of FIG. 2, taken along the line B-B.

Figure 2:
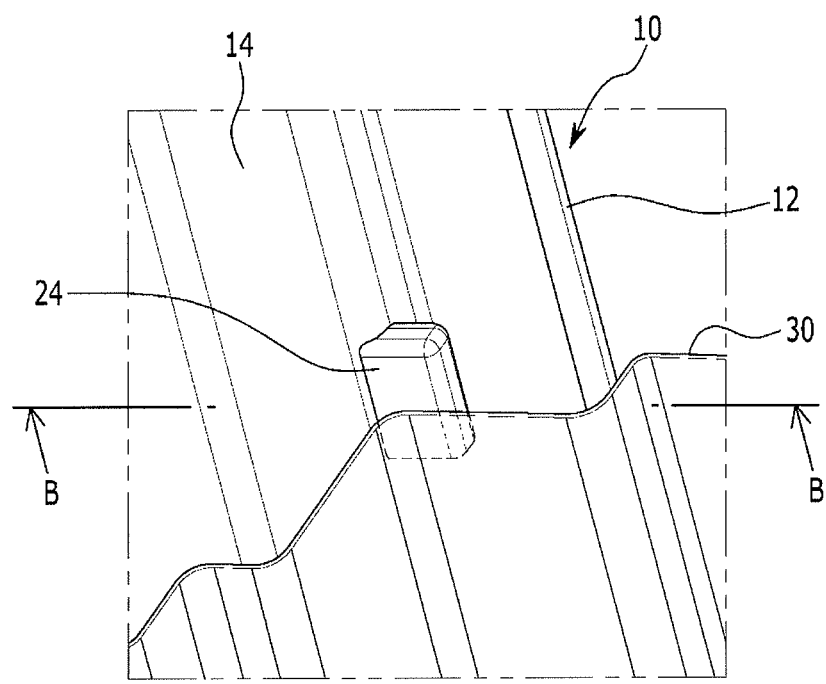
FIG. 2 is an enlarged view of portion A of FIG. 1, and shows a coupling relationship between the door and a side external panel.
Figure 3:
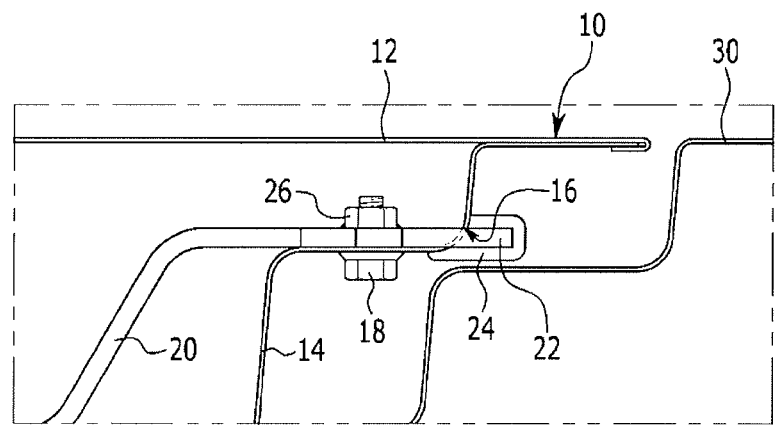
FIG. 3 is a cross-sectional view of FIG. 2, taken along the line B-B.

Referring to FIG. 1 to FIG. 3, in the door structure for a vehicle according to an exemplary embodiment of the present invention, a door 10 may include an external panel 12 that is disposed externally with reference to a width direction of the vehicle and an internal panel 14 that is disposed internally (i.e., in a vehicle internal).

In addition, the door 10 may further include an impact member 20 that horizontally extends in a longitudinal direction of the vehicle and coupled to the internal panel 14 between the external panel 12 and the internal panel 14.

The external panel 12 may include a metallic material including a stainless steel plate or an aluminum plate.

The internal panel 14 may include a carbon fiber reinforced plastics (CFRP) material.

The external panel 12 and the internal panel 14 having the above-described configuration include different types of materials, and therefore they cannot be directly bonded to each other by welding and the like.

Thus, in the present exemplary embodiment the impact member 20 is first fixed to the internal panel 14 and coupled thereto, and then the internal panel 2 is coupled to the external panel 12 by hemming or bonding wherein the door 10 is formed.

Referring to FIG. 2 and FIG. 3, in the present exemplary embodiment, a protrusion 22 that protrudes to the outside toward a side external panel 30 of the vehicle from inside the internal panel 14 may be integrally formed in the impact member 20.

Here, a through-hole 16 may be formed in the internal panel 14 wherein the protrusion 22 penetrates the internal panel 14 through the through-hole 16.

That is, the protrusion 22 protrudes to the outside of the internal panel 14 by penetrating the through-hole 16, and when the door 10 is closed, the protrusion 22 is disposed at a given distance from the side external panel 30.

A bumper member 24 is disposed on the protrusion 22 to prevent direct contact with the side external panel 12.

The bumper member 24 has rubber and plastic properties both, but it may include a thermoplastic elastomer (TPE) that is harder than rubber and more flexible than plastic.

Such a bumper member 24 is bonded to the protrusion 22. That is, the bumper member 24 may be bonded to the protrusion 22 to contact an external side of the internal panel 14 while surrounding an external circumference of the protrusion 22.

Accordingly, the bumper member 24 absorbs an impact incident that may occur between the door 10 and the external side panel 30 when the vehicle is in a driving state or when the door 10 is opened or closed.

Meanwhile, at least one assembly nut that is fastened to the internal panel 14 by the assembly bolt 18 may be coupled to the impact member 20 by welding and the like.

Accordingly, the impact member 20 may be coupled with the internal panel 14 through the assembly bolt 18 that is fastened to the assembly nut 26 while being closely attached to the internal panel 14.

That is, since the internal panel 14 including the CFRP material cannot be coupled to the impact member 20 that includes a metallic material by welding, the internal panel 14 is fastened to the impact member 20 first using the assembly bolt 18 and the assembly nut 26 and then may be coupled to the external panel 12 by hemming and bonding.

In the door 10 having the above-described structure, when an impact incident occurred from a side crash of the vehicle is transferred to the impact member 20 through the external panel 12, the side member 20 absorbs the impact and at the same time transfers the impact incident to the side external panel 30 through the protrusion 22.

In the present case, residual impacts that are dispersedly absorbed to the external panel 12, the impact member 20, and the side external panel 30 are transferred to the internal panel 14 that includes the CFRP material.

Accordingly, the impact incident transferred to the internal panel 14 can be minimized, preventing the internal panel 14 from being damaged.

That is, the door structure for a vehicle according to the exemplary embodiment of the present invention can primarily absorb impact incident in the metallic external panel 12 and the impact member 20 when a side crash of the vehicle occurs, and at the same time the impact is dispersed to the side external panel 30 through the protrusions 22 wherein the impact incident transferred to the internal panel 14 can be minimized while effectively coping with the side crush.

Thus, when a side crush occurs in a vehicle of which the door is according to the exemplary embodiment of the present invention, that is, the door 10 is formed by coupling the external panel 12 including the metallic material and the internal panel 14 including the CFRP material, impact incident generated due to the side crush is transferred to the side external panel 30 through the protrusion 22 of the impact member 20, protruded from the internal panel 14 from the external panel 12 of the door 10 wherein the internal panel 14 can be prevented from being directly damaged.

In addition, the bumper 24 is mounted to the protrusion 22 of the impact member, protruded from the internal panel 14 and the bumper 24 is configured as an over-slap bumper wherein impact and vibration that are generated between the door 10 and the side external panel 30 can be effectively absorbed.

Further, a separately disposed over-slam bumper can be omitted, and accordingly ease of assembly and productivity can be improved and manufacturing cost can be saved.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door structure for a vehicle, comprising:
    an external panel;
    an internal panel that is mounted to the external panel; and
    an impact member coupled to the internal panel between the external panel and the internal panel,
    wherein a protrusion that protrudes to an outside thereof toward a side external panel of a vehicle body from inside the internal panel is integrally provided in the impact member.

2. The door structure for the vehicle of claim 1, wherein a through-hole through which the protrusion penetrates the internal panel is provided in the internal panel.

3. The door structure for the vehicle of claim 1, wherein a bumper member is mounted to the protrusion.

4. The door structure for the vehicle of claim 3, wherein the bumper member includes a thermoplastic elastomer (TPE) material.

5. The door structure for the vehicle of claim 3, wherein the bumper member is bonded to the protrusion.

6. The door structure for the vehicle of claim 3, wherein the bumper member contacts an external side of the internal panel while surrounding an external circumference of the protrusion.

7. The door structure for the vehicle of claim 1, wherein the internal panel includes carbon fiber reinforced plastics (CFRP) material.

8. The door structure for the vehicle of claim 1, wherein the external panel includes a metallic material.

9. The door structure for the vehicle of claim 1, wherein at least one assembly nut that is fastened to the internal panel by an assembly bolt is coupled to the impact member.

* * * * *